United States Patent
Tu et al.

(10) Patent No.: US 12,337,819 B2
(45) Date of Patent: Jun. 24, 2025

(54) CHARGING CONTROL METHOD AND SYSTEM FOR RANGE EXTEND ELECTRIC VEHICLE, AND ELECTRIC VEHICLE

(71) Applicant: Xiamen Yaxon Zhilian Technology Co., Ltd., Fujian (CN)

(72) Inventors: Yankai Tu, Fujian (CN); Yuan Chen, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 57 days.

(21) Appl. No.: 18/006,435

(22) PCT Filed: Jul. 19, 2021

(86) PCT No.: PCT/CN2021/107094
§ 371 (c)(1),
(2) Date: Jan. 23, 2023

(87) PCT Pub. No.: WO2022/017319
PCT Pub. Date: Jan. 27, 2022

(65) Prior Publication Data
US 2023/0264677 A1 Aug. 24, 2023

(30) Foreign Application Priority Data
Jul. 23, 2020 (CN) .......................... 202010716947.8

(51) Int. Cl.
*B60W 20/13* (2016.01)
*B60L 50/61* (2019.01)
(Continued)

(52) U.S. Cl.
CPC ............. *B60W 20/13* (2016.01); *B60L 50/61* (2019.02); *B60W 10/06* (2013.01);
(Continued)

(58) Field of Classification Search
CPC .... B60W 20/13; B60W 10/06; B60W 50/009; B60W 2555/60; B60W 2552/05;
(Continued)

(56) References Cited

FOREIGN PATENT DOCUMENTS

| CN | 102358201 A | 2/2012 |
|---|---|---|
| CN | 103419675 A | 12/2013 |

(Continued)

OTHER PUBLICATIONS

English Translation of EP0829389B1 Title: Power Output Apparatus and Method of Controlling the Same Author: Takaoka et al. Date: Dec. 12, 2001 (Year: 2001).*

(Continued)

*Primary Examiner* — James J Lee
*Assistant Examiner* — Steven Vu Nguyen
(74) *Attorney, Agent, or Firm* — Cooper Legal Group, LLC

(57) ABSTRACT

Disclosed are a charging control method and system for a range extend electric vehicle, and the electric vehicle. The control method includes: presetting a first threshold value and a second threshold value and executing the following steps: when the electric quantity of a battery is lower than the second threshold value, performing forced charging on the battery; when the electric quantity of the battery is lower than the first threshold value and higher than the second threshold value, proceeding to a subsequent step to determine whether $Pv+Pb_1>Pu$ is met, $Pv$, $Pb_1$ and $Pu$ respectively representing current vehicle driving required power, minimum required charging power of the battery and maximum power of a high efficiency running range of an engine; if not, determining the time as an optimal charging time, controlling the engine to increase the power to $Pu$, and charging the battery with a power of $Pu-Pv$; and if so, skipping performing charging, and predicting an optimal (Continued)

Current traveling direction of a vehicle charging time for charging according to a terrain condition or road environment ahead. On the basis of the above charging control method, the optimal charging time of the range extend electric vehicle can be predicted, ensuring that the engine runs in a high efficiency power range while charging the battery, and achieving better economic efficiency.

8 Claims, 2 Drawing Sheets

(51) Int. Cl.
  *B60W 10/06* (2006.01)
  *B60W 50/00* (2006.01)
(52) U.S. Cl.
  CPC . *B60W 50/0097* (2013.01); *B60W 2510/0666* (2013.01); *B60W 2510/244* (2013.01); *B60W 2530/10* (2013.01); *B60W 2552/05* (2020.02); *B60W 2555/60* (2020.02); *B60W 2710/0677* (2013.01)
(58) Field of Classification Search
  CPC ... B60W 2510/0666; B60W 2510/244; B60W 2530/10; B60W 2710/0677; B60L 50/61
  See application file for complete search history.

(56) References Cited

FOREIGN PATENT DOCUMENTS

| | | |
|---|---|---|
| CN | 103732462 A | 4/2014 |
| CN | 109193047 A | 1/2019 |
| CN | 110395144 A | 11/2019 |
| JP | 2002262401 A | 9/2002 |

OTHER PUBLICATIONS

English Translation of CN111169480A Title: A Power System Energy Management Method, Device, Apparatus, and Medium Author: Lin et al. Date: May 19, 2020 (Year: 2020).*

English Translation of CN109895769A Title: Hybrid Electric Vehicle And Constant Speed Cruise Control Method and Control System Author: Liu et al. Date: Jun. 18, 2019 (Year: 2019).*

International Search Report cited in PCT/CN2021/107094 mailed Oct. 15, 2021, 6 pages.

Written Opinion cited in PCT/CN2021/107094 mailed Oct. 15, 2021, 3 pages.

* cited by examiner

CHARGING CONTROL METHOD AND SYSTEM FOR RANGE EXTEND ELECTRIC VEHICLE, AND ELECTRIC VEHICLE

TECHNICAL FIELD

The present invention relates to the technical field of electric vehicles, in particular to a charging control method and system for a range extend electric vehicle, and the electric vehicle.

BACKGROUND

At present, energy management strategies of a range extend electric vehicle (REEV) include a switching mode, a segmentation mode and a power following mode. The power following method greatly reduces the process of charge and discharge. Within a certain high efficiency power range of an engine, an electric motor is directly driven by power generated by the engine driving a generator, so the engine power is always approximately equal to the driving power required by the vehicle. When the driving power required by the vehicle is very low, the engine works at the minimum power point of the preset high efficiency range, and excess power charges a battery. When the driving power is very high and the maximum power of the high efficiency range of the engine is not enough, the battery discharges for supplementing.

The power following method ensures that the engine may run in the high efficiency power range for a long time. However, this method may not guarantee that the SOC of the battery may be maintained in a certain range, and some auxiliary strategies are generally required for force charging when the battery is in low SOC. Since forced charging may cause the engine to run beyond the high efficiency power range, the traditional power following energy management may increase energy consumption due to improper battery charging time.

SUMMARY

To solve the technical problems in the prior art, the present invention provides a charging control method and system for a range extend electric vehicle, and the electric vehicle, which may shorten the time that an engine runs in a non-high efficiency range in order to charge a battery, and have better economic efficiency.

The technical solutions used in the present invention to solve the technical problems are as follows: a charging control method for a range extend electric vehicle includes: presetting a first threshold value and a second threshold value, the first threshold value being greater than the second threshold value; and executing the following steps:

(1) detecting, by a controller, the electric quantity of a battery;
(2) determining, by the controller, the electric quantity of the battery, when the electric quantity of the battery is lower than the first threshold value and higher than the second threshold value, proceeding to a next step, and when the electric quantity of the battery is lower than the second threshold value, controlling, by the controller, the battery to be forcibly charged and returning to step (1) upon completion of charging;
(3) determining, by the controller, whether $P_v+Pb_1>P_u$ is met, $P_v$, $Pb_1$ and $P_u$ respectively representing current vehicle driving required power, minimum required charging power of the battery and maximum power of a high efficiency operation range of an engine; if $P_v+Pb_1>P_u$ is not met, determining the time as an optimal charging time, controlling the engine to increase the power to $P_u$, charging the battery with a power of $P_u-P_v$, and returning to P step (1) upon completion of charging; and if $P_v+Pb_1>P_u$ is met, skipping performing charging and proceeding to the next step; and
(4) predicting an optimal charging time according to a terrain condition or road environment ahead, performing charging at the optimal charging time, and returning to step (1) upon completion of charging.

As a preferred solution of the present invention, in step (4), the controller predicts predicted required power $P_v$ for vehicle driving in the terrain condition or road environment ahead, and determines whether $P_v'+Pb_1>P_u$ is met, if $P_v'+Pb_1>P_u$ is not met, the time when the vehicle reaches a road ahead and $P_v'+Pb_1<P_u$ is met is the optimal charging time, and charging starts; otherwise, charging is not performed.

As a preferred solution of the present invention, in the case that the optimal charging time does not occur in the terrain condition or road environment ahead, when the electric quantity of the battery is lower than the second threshold value, the controller controls the battery to be forcibly charged to the first threshold value.

As a preferred solution of the present invention, in the case that the terrain condition or road environment ahead has a slope change, the predicted required power $P_v$ is estimated as follows:

(1) reading a current engine load percentage value N, N being a percentage of current power to maximum power $W_{max}$ of the engine, and acquiring a current slope value $\theta_0$ and a slope ahead value $\theta i$ from an electronic horizon; and
(2) assuming that the vehicle travels in a similar state and a speed is V, at a road segment ahead with the slope $\theta_i$, when a predicted load percentage of the engine is calculating to obtain the predicted required power $P_v'=N_i'W_{max}$.

As a preferred solution of the present invention, a traction change caused by the slope is:

$F_s = mg\sin(\theta_i-\theta_0) \approx mg(\theta_i-\theta_0)$ a power change is: $P=mgV(\theta_i-\theta_0)$; and
the predicted load percentage of the engine is: $N_i'=N+mgV(\theta_i-\theta_0)/W_{max}$,
where m is the mass of the vehicle, and g is an acceleration of gravity.

As a preferred solution of the present invention, in the case that the terrain condition or road environment ahead has a speed limit change, and speed limit information of a point j ahead acquired from the electronic horizon is $V_j$, the speed is replaced by $V_j$, correspondingly, the predicted load percentage $N_j'$ is: $N_j'=N+mgV_j(\theta_i-\theta_0)/W_{max}$, and the predicted required power is: $P_v'=N_j'W_{max}$.

As a preferred solution of the present invention, in the case that the terrain condition or road environment ahead has curve information, and a turning radius and a turning angle of a point k ahead acquired from the electronic horizon are $R_k$ and $\alpha_k$, a turning resistance coefficient $f_r$ in an ideal state is: $f_r=(V^2/Rg)a$;
a power increased by the curve is:

$$P = mgVf_r = \frac{a_k m V^3}{R_k};$$

a total increased power is:

$$mgV_f(\theta_i - \theta_0) + \frac{a_k m V_j^3}{R_k};$$

and $$N'_k = N + \left[mgV_j(\theta_i - \theta_0) + \frac{a_k m V_j^3}{R_k}\right]/W_{max};$$

and
the predicted required power is $P_v' = N_k' W_{max}$;
where R is a turning radius, and a is a turning angle.

A charging control system for a range extend electric vehicle includes an engine, a generator, an electric motor, a battery, and a controller, the generator being connected to the electric motor, the battery and the engine, the controller being connected to the engine and the generator. The controller is further connected to an electronic horizon system to acquire a terrain condition or road environment ahead of the vehicle, and controls the engine to drive the generator to charge the battery by using the above charging control method for the range extend electric vehicle.

A range extend electric vehicle includes a vehicle body, and further includes the above charging control system for the range extend electric vehicle mounted in the vehicle body.

By means of the above technical solutions, compared with the prior art, the present invention has the following beneficial effects:

1. The method, the system and the electric vehicle according to the present invention can be combined with electronic horizon information to predict the optimal charging time for the range extend electric vehicle (REEV), ensuring that the engine runs in the high efficiency power range while charging the battery, and having better economic efficiency.

2. The method, the system and the electric vehicle according to the present invention can directly determine the optimal charging time based on the current vehicle driving required power, the minimum required charging power of the battery and the maximum power of the high efficiency running range of the engine, or predict the optimal charging time by combining the predicted required power for vehicle driving in the terrain condition or road environment ahead, achieving optimal energy management.

3. The method, the system and the electric vehicle according to the present invention can calculate the predicted required power according to the acquired change information in the terrain condition or road environment ahead, including the slope change, the speed limit change, the curve change, etc., achieving prediction of the optimal charging time for different road conditions.

4. The method, the system and the electric vehicle according to the present invention can also be extended according to the actual situation. That is, if there are other factors involved in changing the required power of the vehicle in the road ahead information available from the electronic horizon, predicted required power is correspondingly calculated based on the effect of the factors on power.

DESCRIPTION OF EMBODIMENTS

The technical solutions of the present invention are described below in detail in conjunction with the accompanying drawings and embodiments.

Embodiments

Figure 1:
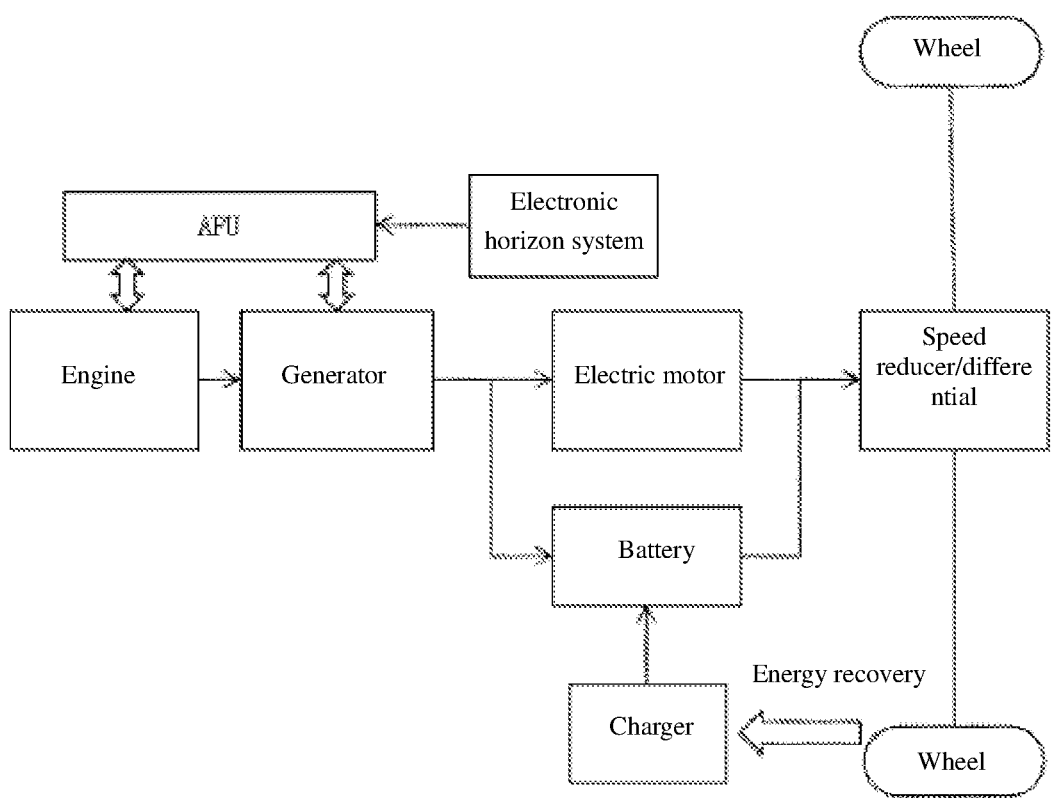
FIG. 1 is a structural block diagram of a range extend electric vehicle according to an embodiment of the present invention.

Referring to FIG. 1, a charging control system for a range extend electric vehicle according to the present invention is provided with a controller, an engine, a generator, an electric motor, a battery, etc. The generator is connected to the electric motor and the battery, and the electric motor is used for driving a speed reducer or a differential to operate. The controller (namely an APU) is connected to the engine and the generator, and directly drives the electric motor through power generated by controlling the engine to drive the generator, or controls the engine to drive the generator to charge the battery. The controller is also connected to an electronic horizon system to acquire a terrain condition or road environment ahead of the vehicle from the electronic horizon system. The controller uses the charging control method for the range extend electric vehicle according to the present invention to perform predictive control over the state of charge (SOC) of the battery based on the predicted condition of the terrain ahead, which may ensure to a greater extent that the engine runs in the high efficiency power range even when charging the battery.

The electronic horizon in the present invention includes map data, GPS/BeiDou positioning, and a forward search engine, etc., and features resolving the positioning latitude and longitude positions of a vehicle through a GPS/BeiDou satellite positioning system as well as traveling direction information of the vehicle, searching an electronic horizon map for geographic information ahead of the vehicle, and transmitting the geographic information ahead to the controller via a CAN bus or an Ethernet bus. The system needs terrain condition or road environment information closely related to changes of required power of the vehicle, such as slope information, curve information and speed limit information.

A charging control method for a range extend electric vehicle according to the present invention includes: preset a first threshold value and a second threshold value, the first threshold value being an optional charging threshold value, the second threshold value being a forced charging threshold value, the first threshold value being greater than the second threshold value, the first threshold value and the second threshold value being set according to requirements, which are not limited; and execute the following steps:

(1) Detect, by a controller, the electric quantity of a battery.

(2) Determine, by the controller, the electric quantity of the battery, when the electric quantity of the battery is lower than the first threshold value and higher than the second threshold value, skip immediately increasing, by the controller, the power of an engine for charging control over the battery, and proceed to a next step, and when the electric quantity of the battery is lower than the second threshold value, control, by the controller, the battery to be forcibly charged, and return to step (1) upon completion of charging.

(3) Determine, by the controller, whether $P_v+Pb_1>P_u$ is met, $P_v$, $Pb_1$ and $P_u$ respectively representing current vehicle driving required power, minimum required charging power of the battery and maximum power of a high efficiency running range of an engine; if $P_v+Pb_1>P_u$ is not met, determine the time as an optimal charging time, control the engine to increase the power to $P_u$, charge the battery with a power of $P_u-P_v$, and return to step (1) upon completion of charging; and if $P_v+Pb_1>P_u$ is met, skip performing charging and proceed to the next step.

(4) Predict an optimal charging time according to a terrain condition or road environment ahead, perform charging at the optimal charging time, and return to step (1) upon completion of charging.

In step (4), the controller predicting the optimal charging time specifically includes: predict predicted required power $P_v'$ for vehicle driving in the terrain condition or road environment ahead, and determine whether $P_v'+Pb_1>P_u$ is met, if $P_v'+Pb_1>P_u$ is not met, the time when the vehicle reaches a road ahead and $P_v'+Pb_1<P_u$ is met is the optimal charging time, and charging starts; otherwise, charging is not performed.

In the process of predicting the optimal charging time in step (4), in the case that the optimal charging time does not occur in the terrain condition or road environment ahead, when the electric quantity of the battery is lower than the second threshold value, the controller controls the battery to be forcibly charged until the SOC of the battery reaches the first threshold value.

The calculation of the predicted power according to the present invention is derived from the vehicle power stationary formula. In the case that the terrain condition or road environment ahead has a slope change, the predicted required power $P_v'$ is estimated as follows:

(1) Read a current engine load percentage value N, N being a percentage of current power to maximum power $W_{max}$ of the engine, and acquire a current slope value $\theta_0$ and a slope ahead value $\theta_i$ from an electronic horizon.

(2) Assume that the vehicle travels in a similar state and a speed is V, at a road segment ahead with the slope $\theta_i$, when a predicted load percentage of the engine is $N_i'$, calculate to obtain the predicted required power $P_v'=N_i'W_{max}$.

A traction change caused by the slope is: $F_s=mg \sin(\theta_i-\theta_0) \approx mg(\theta_i-\theta_0)$;

a power change is: $P=mgV(\theta_i-\theta_0)$; and
the predicted load percentage of the engine is: $N_i'=N+mgV(\theta_i-\theta_0)/W_{max}$;
where m is the mass of the vehicle, and g is an acceleration of gravity.

Figure 2:
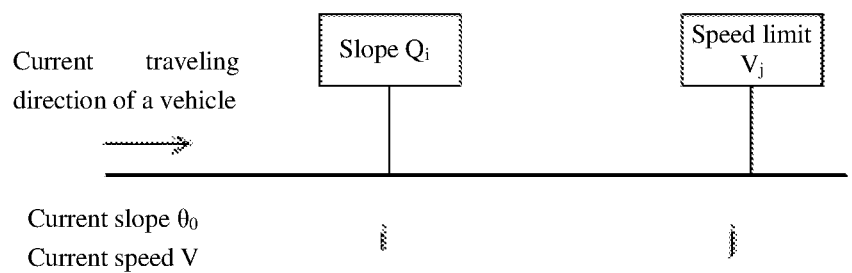
FIG. 2 is a relation diagram of a speed limit $V_j$ and a slope $\theta_i$ from an electronic horizon system according to an embodiment of the present invention.

Further, as shown in FIG. 2, in the case that the terrain condition or road environment ahead has, in addition to the slope change, a speed limit change, and speed limit information of a point j ahead acquired from the electronic horizon is $V_j$, the speed is replaced by $V_j$ when reaching the point j, correspondingly, the predicted load percentage $N_j'$ is: $N_j'=N+mgV_j(\theta_i-\theta_0)/W_{max}$, and the predicted required power is: $P_v'=N_j'W_{max}$.

Figure 3:
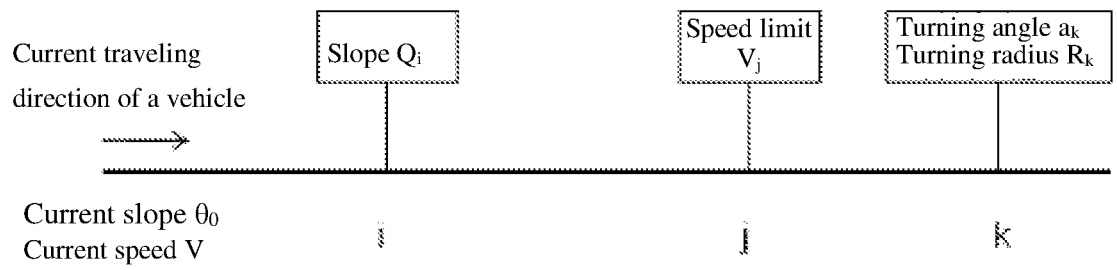
FIG. 3 is a relation diagram of a speed limit $V_j$, a slope $\theta_i$, a turning radius and a turning angle from an electronic horizon system according to an embodiment of the present invention.

Further, as shown in FIG. 3, in the case that the terrain condition or road environment ahead also has curve information, that is, a turning radius and a turning angle of a point k ahead acquired from the electronic horizon are $R_k$ and $\alpha_k$, a turning resistance coefficient $f_r$ in an ideal state is:
$f_r=(V^2/Rg)a$;

a power increased by the curve is:

$$P = mgVf_r = \frac{a_k m V^3}{R_k};$$

a total increased power is:

$$mgV_j(\theta_i - \theta_0) + \frac{a_k m V_j^3}{R_k},$$

and $$N_k' = N + \left[mgV_j(\theta_i - \theta_0) + \frac{a_k m V_j^3}{R_k}\right]/W_{max};$$

the predicted required power is $P_v'=N_k'W_{max}$,
where R is a turning radius, and a is a turning angle.

In practical applications, the present invention may also be extended according to the actual situation. That is, if there are other factors involved in changing the required power of the vehicle in the road ahead information available from the electronic horizon, predicted required power is correspondingly calculated according to a published, well-known, and axiomatic formula based on the effect of the factors on power.

Referring to FIG. 1, the present invention further provides a range extend electric vehicle, including a vehicle body and the above charging control system for the range extend electric vehicle mounted in the vehicle body. The charging control system for the range extend electric vehicle controls an engine to drive a generator to charge a battery by using the charging control method for the range extend electric vehicle according to the present invention, ensuring that the engine runs in the high efficiency power range while charging the battery, and achieving better economic efficiency.

The method and apparatus according to the present invention can predict a reasonable charging time for the range extend electric vehicle (REEV) based on the information of the electronic horizon, shortening the time that the engine runs in a non-high efficiency range in order to charge the battery, and achieving better economic efficiency.

The foregoing are merely preferred embodiments of the present invention and are not intended to limit the present invention in any way. Although the present invention has been described with reference to the preferred embodiments, it is not intended to be limited thereto. Any person skilled in the art, without departing from the scope of the technical solutions of the present invention, may make many possible variations and modifications to the technical solutions of the present invention based on the technical content disclosed above, or modify it to equivalent embodiments. Therefore, any simple modifications, equivalent changes and modifications of the above embodiments in accordance with the technical substance of the present invention without departing from the technical solutions of the present invention shall fall within the scope of protection of the technical solutions of the present invention.

INDUSTRIAL APPLICABILITY

The charging control system for the range extend electric vehicle on which the charging control method for the range extend electric vehicle according to the present invention is based includes the controller, the engine, the generator, the electric motor, the battery, etc. The controller is an electronic component. The electronic horizon system is a database system that may provide the vehicle with accurate real-time information of the road ahead. By means of the electronic horizon system, the speed limit information of the road ahead, traffic lights, construction sites, obstacles and other types of dynamic data and actual road data may be acquired. The controller may acquire the terrain condition or road environment ahead of the vehicle through the connection with the electronic horizon system. The present invention can directly determine the optimal charging time based on the current vehicle driving required power, the minimum required charging power of the battery and the maximum power of the high efficiency running range of the engine, or predict the optimal charging time by combining the predicted required power for vehicle driving in the terrain condition or road environment ahead, achieving optimal energy management. The present invention is easy to implement in industry, and various components such as the controller, the engine, the generator, the electric motor and the battery are also easy to process in industry, thus achieving industrial applicability.

The invention claimed is:

1. A charging control method for a range extend electric vehicle, comprising: presetting a first threshold value and a second threshold value, the first threshold value being greater than the second threshold value; and executing the following steps:
   (1) detecting, by a controller, an electric quantity of a battery;
   (2) determining, by the controller, the electric quantity of the battery, when the electric quantity of the battery is lower than the first threshold value and higher than the second threshold value, proceeding to a next step, and when the electric quantity of the battery is lower than the second threshold value, controlling, by the controller, the battery to be forcibly charged and returning to step (1) upon completion of charging;
   (3) determining, by the controller, whether $P_v+Pb_1>P_u$ is met, $P_v$, $Pb_1$ and $P_u$ respectively representing current vehicle driving required power, minimum required charging power of the battery and maximum power of a high efficiency running range of an engine; when $P_v+Pb_1>P_u$ is not met, determining a time as an optimal charging time, controlling the engine to increase power to $P_u$, charging the battery with a power of $P_u-P_v$, and returning to step (1) upon completion of charging; and when $P_v+Pb_1>P_u$ is met, skipping performing charging and proceeding to the next step; and
   (4) predicting an optimal charging time according to a terrain condition or a road environment ahead, performing charging at the optimal charging time, and returning to step (1) upon completion of charging;
   wherein in step (4), the controller predicts predicted required power $P_v'$ for vehicle driving in the terrain condition or the road environment ahead, and determines whether $P_v'+Pb_1>P_u$ is met, when $P_v'+Pb_1>P_u$ is not met, a time when the vehicle reaching a road ahead and $P_v'+Pb_1<P_u$ is met is the optimal charging time, and charging starts; otherwise, charging is not performed.

2. The charging control method for the range extend electric vehicle according to claim 1, wherein in the case that the optimal charging time does not occur in the terrain condition or the road environment ahead, when the electric quantity of the battery is lower than the second threshold value, the controller controls the battery to be forcibly charged to the first threshold value.

3. The charging control method for the range extend electric vehicle according to claim 1, wherein in the case that the terrain condition or the road environment ahead has a slope change, the predicted required power $P_v'$ is estimated as follows:
   (1) reading a current engine load percentage value N, N being a percentage of current power to maximum power $W_{max}$ of the engine, and acquiring a current slope value $\theta_0$ and a slope ahead value $\theta_i$ from an electronic horizon; and
   (2) assuming that the vehicle travels in a similar state and a speed is V, at a road segment ahead with the slope ahead value $\theta_i$, when a predicted load percentage of the engine is $N_i'$, calculating to obtain the predicted required power $P_v'=N_i'W_{max}$.

4. The charging control method for the range extend electric vehicle according to claim 3, wherein a traction change caused by the slope is: $F_s=mg\ \sin(\theta_i-\theta_0)\approx mg\ (\theta_i-\theta_0)$;
   a power change is: $P=mgV(\theta_i-\theta_0)$; and
   the predicted load percentage of the engine is: $N_i'=N+mgV(\theta_i-\theta_0)/\approx W_{max}$,
   wherein m is a mass of the vehicle, and g is an acceleration of gravity.

5. The charging control method for the range extend electric vehicle according to claim 4, wherein in the case that the terrain condition or the road environment ahead has a speed limit change, and speed limit information of a point j ahead acquired from the electronic horizon is $V_j$, the speed is replaced by $V_j$, correspondingly, the predicted load percentage $N'_j$ is: $N'_j=N+mgV_j(\theta_i-\theta_0)/W_{max}$, and the predicted required power is: $P_v'=N'_jW_{max}$.

6. The charging control method for the range extend electric vehicle according to claim 4, wherein in the case that the terrain condition or the road environment ahead has curve information, and a turning radius and a turning angle of a point k ahead acquired from the electronic horizon are $R_k$ and $a_k$,
   a turning resistance coefficient $f_r$ in an ideal state is: $f_r=(V^2/Rg)a$; a power increased by the curve is:

$$P = mgVf_r = \frac{a_k m V^3}{R_k};$$

a total increased power is:

$$mgV_j(\theta_i - \theta_0) + \frac{a_k m V_j^3}{R_k},$$

and $$N'_k = N + \left[mgV_j(\theta_i - \theta_0) + \frac{a_k m V_j^3}{R_k}\right]/W_{max};$$

the predicted required power is $P_v'=N'_k W_{max}$,
wherein R is a turning radius, and a is a turning angle.

7. A charging control system for a range extend electric vehicle, comprising an engine, a generator, an electric motor, a battery, and a controller, the generator being connected to the electric motor, the battery and the engine, the controller being connected to the engine and the generator, wherein the controller is further connected to an electronic horizon system to acquire a terrain condition or a road environment ahead of the range extend electric vehicle, and controls the engine to drive the generator to charge the battery by using the charging control method for the range extend electric vehicle according to claim 1.

8. A range extend electric vehicle comprising a vehicle body, further comprising the charging control system for the range extend electric vehicle according to claim 7, mounted in the vehicle body.

* * * * *